Nov. 9, 1948.　　　　　　L. D. STATHAM　　　　　2,453,549
ELECTRIC STRAIN GAUGE
Filed July 14, 1947　　　　　　　　　　　　　　2 Sheets-Sheet 1

INVENTOR.
Louis D. Statham
BY
ATTORNEY.

Nov. 9, 1948.　　　　　L. D. STATHAM　　　　2,453,549
ELECTRIC STRAIN GAUGE
Filed July 14, 1947　　　　　　　　　　　　2 Sheets-Sheet 2
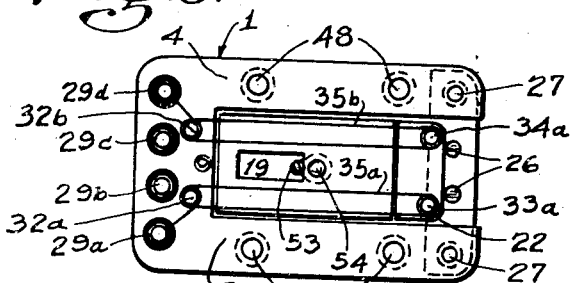
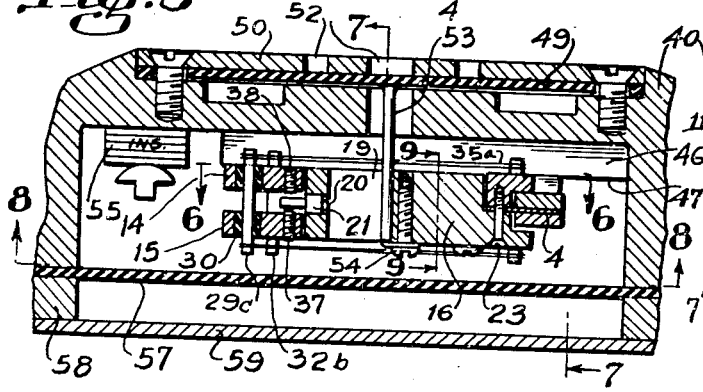
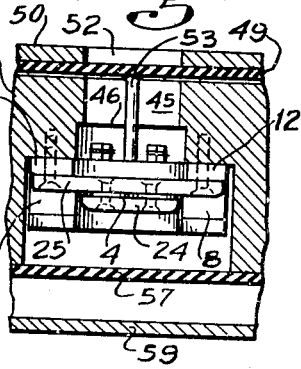
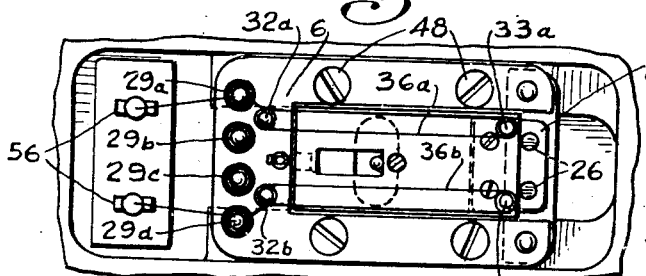
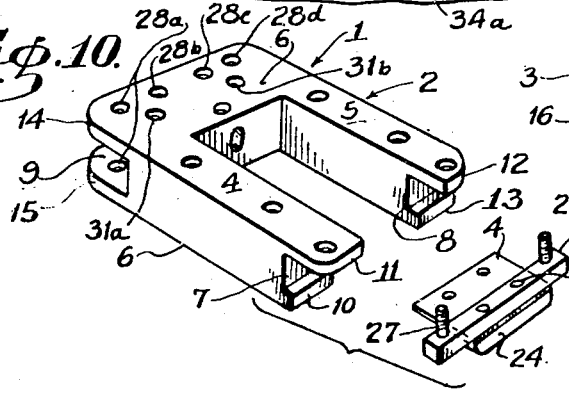
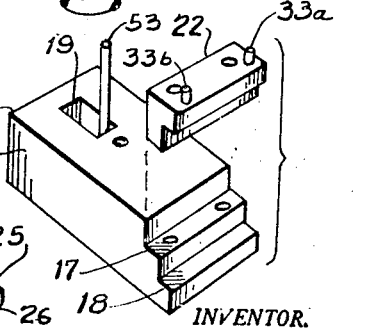
INVENTOR.
Louis D. Statham
BY
ATTORNEY.

Patented Nov. 9, 1948

2,453,549

UNITED STATES PATENT OFFICE 2,453,549

ELECTRIC STRAIN GAUGE

Louis D. Statham, Beverly Hills, Calif., assignor to Statham Laboratories, Inc., Los Angeles, Calif., a corporation of California Application July 14, 1947, Serial No. 760,772

10 Claims. (Cl. 201—63)

This invention relates to a construction of wire resistance strain gauges of the so-called unbonded type. Such gauges are composed essentially of a strain sensitive wire connected to two supports which are subject to separation under an applied force. When subjected to tension the wire changes in dimension and therefore changes in resistance. Means are provided for measuring the resulting change in resistance which is then translatable into a measurement of the applied force. Such gauges have found a wide application in science and industry and are described in an article entitled "Applications of unbonded type resistance gauges," by Richard D. Meyer, published in "Instruments," vol. 19, No. 3, March, 1946.

The gauges referred to in that article are composed of a frame in which is mounted an armature supported by two flexible plates which are in turn connected to the frame. These plates support the armature rigidly in a plane perpendicular to the longitudinal axis of the gauge but allow free movement along this axis. Wound around rigid pins are four windings of strain sensitive wire which comprise the four elements of the Wheatstone bridge. The wires of the winding extend substantially parallel to the longitudinal axis of the gauge. As the armature is caused to move longitudinally by an external force the strain in one pair of windings increases while in the other pair it decreases. Sufficient initial tension is applied to the wires during assembly to keep them under some residual tension when the armature is at either extreme position. The armature travel is limited by a pin in the armature which fits into a hole on the cross piece fastened to the frame. The nature of the movement involved may be obtained from the maximum permissible movement of the armature either side of center which is equal to 0.0015". Where displacements of greater character are to be measured suitable connections must be made.

The line of application of the force in the gauge referred to above is parallel to the strain wires, that is, it is applied perpendicularly to the axis of the loops of wire which form the strain wire gauge. Since, in order to obtain measurable changes in resistance, it is necessary to use wires of considerable length, it becomes necessary to separate the points of support of the wire by a relatively large distance. Therefore, the gauge in the direction of the applied force is of substantial dimension. For some purposes it has been found that the instruments and case necessary to enclose the same have undesirably large dimensions. Additionally, the limitation which is imposed upon the degree of extension of the wires which is tolerable without deleteriously affecting the functioning of the gauge, where the force is applied in a direction parallel to the strain wire, imposes a severe limitation on the magnitude of the permissible movement of the force applying member.

I have now devised an unbonded strain wire gauge which has all of the advantages of the unbonded strain gauge described in the above mentioned publication and in addition the advantage that the dimensions of the instrument in the direction of the applied force are much smaller, and also the additional advantage that a greater movement of the force applying member is tolerable than would be permissible in the previously mentioned form of gauge. Thus, the sensitivity of the gauge is increased. Furthermore, the sensitivity and power output of the gauge is also increased since the total distension of the wire obtainable by the application of any given force is multiplied because of a mechanical advantage which is built into the gauge.

I accomplish these advantageous results by applying the force in a direction perpendicular to the longitudinal axis of the gauge, that is, perpendicular to the wires and parallel to the axis of the loops. This is accomplished by so mounting the supporting pins of the wire that in the case of each loop upon the application of the force to be measured one of the pins is stationary but the other pin moves in an arcuate path by tilting to either increase the tension in the wire or decrease the tension thereof, depending upon which side of the neutral axis of the gauge the pin is positioned. I accomplish this result by mounting the pins upon a bell crank or similar lever arrangement whereby the point of application of the force is at a relatively large distance from the fulcrum point of the lever while the tilting pins are mounted more closely to the fulcrum point of the lever system.

By this arrangement a small force is multiplied, because of the mechanical advantages of the lever system, to give a relatively larger tension on the wires, depending upon the constants of the lever system. Additionally, the point of application of the force moves through a relatively large distance compared to the chord of the arc through which the pin moves and therefore the wires are distended a relatively short distance compared to the movement of the force applying point. By mounting the pin substantially at the fulcrum point, and since the angle through which the pin moves is small, on the order of a degree or a fraction of a degree or a fraction of a degree, the decrease or increase in length of the wire is directly proportional to the movement of the force applying member within the limit of accuracy of the resistance measuring apparatus and the gauge is thus sensibly linear in character.

I accomplish these results by mounting the armature upon a hinge so that it pivots thereon about the center of the hinge axis which is in turn mounted on the frame. By employing a sheet of spring metal between the armature and the frame and causing the armature to be deflected by the force applying means so that the spring bends, I obtain these advantages and the additional advantage that the spring can assist in bringing the system back to neutral when the force is removed. In such a system the armature moves in a direction approximately perpendicular to the wire instead of parallel thereto as in the former mentioned type of strain gauge.

These and other advantages will appear from the further description of the invention taken together with the drawings which show one form of application of such a strain wire gauge to a pressure gauge. In the drawings, Fig. 1 is a fragmentary top view of the pressure gauge employing the strain wire gauge of my invention showing some parts broken away;

Fig. 5 is an enlarged fragmentary section taken similarly to Fig. 2;

Fig. 6 is a plan view of the strain wire gauge taken on section line 4—4 of Fig. 3;

Fig. 7 is a view taken along line 7—7 of Fig. 5;

Fig. 8 is a section taken along line 8—8 of Fig. 5;

Fig. 9 is a section taken on line 9—9 of Fig. 5;

Fig. 10 is an exploded perspective view of the frame and the spring; and

Fig. 11 is an exploded perspective view of the armature.

Figure 1:
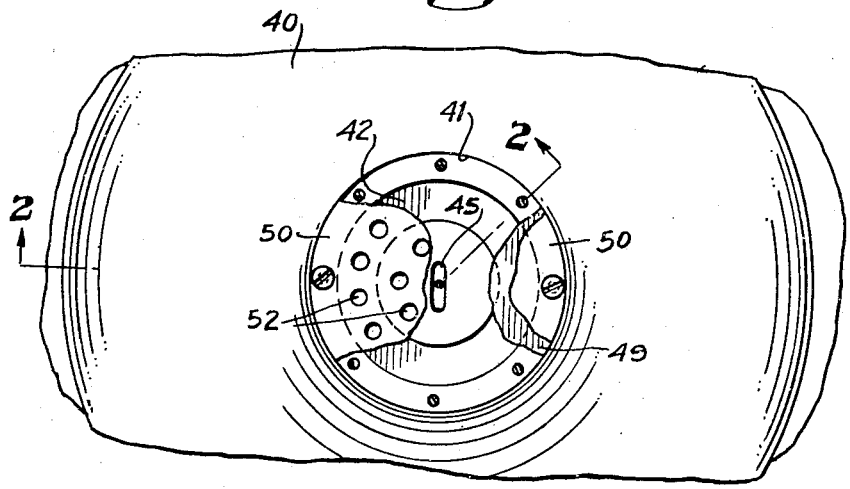
Figure 2:
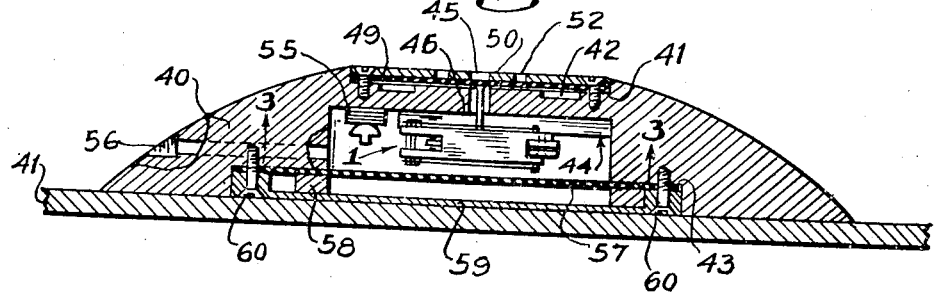
Fig. 2 is a section taken on the line 2—2 of Fig. 1.

The wire strain gauge is in the form of a dynamometer 1 composed of a frame 2 in which an armature 3 is hingedly mounted upon a leaf spring 4. The frame is formed of a U-shaped block having legs 4 and 5 and a base 6. An end slot 7 is formed at one end of the leg 4 and an end slot 8 is formed at one end of the leg 5 and a slot 9 is formed in the base 6 of the frame to give lips 10 and 11 at the end of leg 4 and lips 12 and 13 at the end of leg 5 and lips 14 and 15 at the slot 9.

The armature is formed of a block 16 the end of which is formed in steps 17 and 18. The armature is slotted at 19 and carries a bore 20 in which is positioned a pin 21. The flat spring 4 is clamped on steps 17 by the L-shaped block 22 by means of screws 23 which pass through bores in the L-shaped block, armature, and spring. The spring is clamped to the frame by the short bar 24 which fits over the step 18. Clearance is provided between the bar 24 and the tread and the rise of the step 18, as shown in Fig. 5. The spring 4 is clamped between the short bar 24 and a long bar 25 by the screws 26 which pass through suitably provided bores in 4, 24, and 25. The long bar 26 is introduced into the slots 7 and 8 underneath the lips 12 and 10 and clamped to the U-shaped frame by means of the screws 27 which pass through suitably provided bores in the lips 10, 12, and 27. The armature is thus a cantilever supported at one end by the hinge spring 4 and free and unsupported at the other end.

Four bores 28a, 28b, 28c, and 28d are formed in each of the lips 14 and 15 and four metallic pins 29a, 29b, 29c, and 29d pass through insulating bushings 30 positioned in the bores. Additionally, two more bores 31a and 31b are also positioned in each of the lips 14 and 15 in each of the opposite faces of the frame and aligned on a line parallel to the line of centers of the bores 28a to 28d and spaced to be between the legs 4 and 5. Anodized aluminum pins 32a and 32b are positioned in bores 31a and 31b.

The armature carries two anodized pins on each of the opposite faces constructed in the same manner as the pins 32a and 32b. Thus, two clamping pins 33a and 33b are positioned on the clamping block 22 and two pins 34a and 34b on the underneath side of step 18. The axes of the pins 33a and 34a are coaxially disposed as are pins 34a and 34b and thus the respective axes are substantially in line with the space between the opposing faces of the bar 25, the L-shaped block 22, and also the bar 24 and the rise of the step 18. They are thus coincident with the hinge axis of the hinge between the armature and the frame. The pins are thus positioned on the opposite faces of the frame and the complementary opposite faces of the armature which are coplanar with the complementary frame faces.

Strain sensitive wires 35a, 35b, 36a, and 36b, such as described in the Meyer article referred to above, are wound in loops around pins, as shown in Figs. 6 and 7. Thus, loop 36a is wound as a continuous spiral loop around pins 32a and 33a, and loop 36b around 32b and 34a, and loop 35b around 32b and 34a, and loop 35a around 32a and 33a.

The ends of the loop 35b are connected to pins 29d and 29c, respectively. The ends of the loop 35a are connected to 29a and 29b, respectively. The ends of the loops 36a are connected to the pins 29c and 29a, respectively and the ends of the loops 36b are connected to the pins 29d and 29b, respectively. The loops are insulated from the pins 32a, 32b, 34a, and 34b and as they are spaced from the frame and armature when wound on the pins they are insulated from the frame and the armature. By the above connection to the terminal pins 28a to 28d, inclusive, they are connected in a Wheatstone bridge arrangement.

Stop pin 37 is screwed into the lip 15 and stop pin 38 is screwed into the lip 14, the pin 21 passing through an elongated slot 39 in the base of the U. By adjusting the stop pins 37 and 38 the deflection of the armature is prevented from exceeding the safe limit of the gauge.

The force to be measured may be applied to the armature as through the rod 53. As will be observed the bell crank ratio as well as the length of the wires may be altered by shifting the pins 33a, 33b, 34a, and 34 more closely to the hinge axis and by moving the rod 53 closer to or further away from the hinge axis and/or by varying the height of the pins.

It will be observed that the application of any force to the cantilevered armature will cause the spring to bend to elongate one of the pairs of wires, i. e. increase the tension, on one side of the frame and armature and to reduce the tension on the wires mounted on the opposite face of the armature and frame. The armature is thus held in its neutral position with the spring flat by the tension of the wires as well as by the spring. The spring, for example, may contribute only about 5 to 10% of the restoring force so that is may be said that substantially the entire applied force is used to affect the tension of the wires and that the wires contribute substantially entirely to the restoring force.

The bell crank may cause a multiplication of the applied force by reason of the bell crank arrangement. Thus the greater the ratio of the distance of the rod 53 from the hinge point to the height of the pins upon which the wire is wound, the greater the mechanical advantage.

A dynamometer as constructed above has wide utility in measuring the magnitude of any force which can be transmitted and applied to the armature to deflect the armature on the spring 4. Its functioning and properties will be further explained by reference to one useful application in a pressure gauge as illustrated in the drawings.

Figures 3, 4:
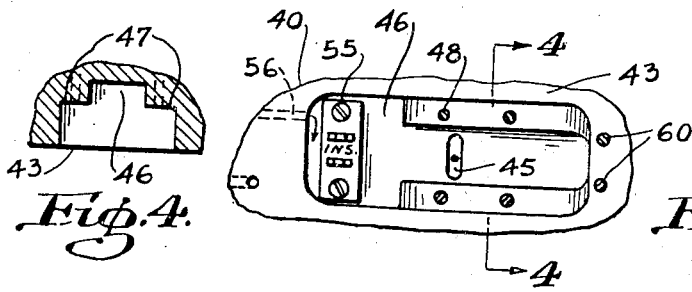
Fig. 3 is a fragmentary section taken on the line 3—3 of Fig. 2.
Fig. 4 is a section taken on the line 4—4 of Fig. 3.

The pressure gauge is composed of a case 40 mounted on a base 41. The top of the case 40 is bored at 41 and grooved at 42 to give an annular shoulder at 41 and an annular groove at 42 is formed in the base of the bore. The underneath side of the case 40 is milled to give a rectangular chamber 44 and a rectangular shoulder 43. A central elongated slot 45 passes through the top of the case 40 connecting chamber 44 with the outside of the case. The top of the chamber 44 is slotted at 46 to a width equal to the distance between the inner face of the legs 4 and 5 (see Figs. 4 and 9). This provides shoulders 47 at the top of the chamber 44. The legs 4 and 5 of the frame are mounted on these shoulders by screws 48.

Positioned on the bored out shoulder 41 and over the annular groove 42 is a flexible diaphragm 49 which is held in place by the cover 50 held on the case 41 by the screws 51. The cover carries fluid pressure transmitting holes 52. The rod 53 is connected to the underneath side of the diaphragm 49 and to the armature by the screws 54.

Mounted on a block 55 of insulating material are the terminals 56 to which the terminal pins 29a to 29d are each connected, and insulated leads from each of these terminals pass through the opening 56 in the case to a terminal outlet, not shown.

Mounted on the shoulder 43 is a flexible diaphragm 57 which is held in place by the clamp 58 and the back cover 59 which is held in position by screws 60 which pass into the cover 40.

The chamber 44 is filled with a good grade of insulating oil having a small viscosity temperature coefficient or organo silicon polymer and the space between the diaphragms 57 and 59 contains air or gas and may be connected to a balancing gas pressure source.

It will be observed that when a fluid pressure is exerted against the face of the plate 50, the diaphragm 49 will be deflected to push the rod 53 downward. This will cause the armature to be deflected downward, causing a deflection of the spring 4. In so doing the pins 33a and 33b, being at the axis of the hinge, will pivot to the left and the pins 34a and 34b will pivot to the right about the axis of the bending line in spring 4. The angle through which the pins will pivot is of course determined by the degree of downward movement of the rod 53. Depending on this angle, we will get an equivalent increase in the distance between pins 32a and 32b and the pins 33a and 33b and an equivalent decrease in the distance between the pins 32a and 32b and the pins 33a and 33b.

Since this causes a resultant increase in the tension in the wires of the loops 36a and 36b and since, in order to prevent damage to the gauge, this cannot exceed an upper limit, depending on the characteristics of the gauge, the overload is prevented by adjusting the stop pins 37 and 38 to prevent excessive deflection of the armature by an excessive travel of the rod 53.

The degree of deflection of the rod 53 is controlled by the flexibility of the diaphragm 49 and its mounting as well as by the stiffness of the armature mounting. The gauge therefore is useful for a fixed range of pressures, depending on the foregoing limiting characteristics.

It will be observed, however, that by the arrangement indicated above the separation of the pins 34a, 34b, 32a, and 32b is but a fraction of the travel of the rod 53. The rod, armature, pin mounting is essentially a bell crank so that the pin travel is at the bell crank ratio of the travel of the rod 53. Thus, I can tolerate a far greater deflection of the diaphragm than is tolerable where the rod is mounted parallel to the wires, as in the gauge described in the Meyer article.

This increases the sensitivity of the pressure gauge, for I may thus use a more flexible diaphragm 49, or in the alternative I may employ the gauge over a far greater pressure range, since I may tolerate a greater deflection of the diaphragm than in the aforementioned gauge. The sensitivity of the gauge depends upon a variation in resistance which is observable by available measuring instruments. It therefore depends upon the minimum force which will cause such a variation in tension of the wires to cause such a threshold change in resistance. The gauge according to the design described above has an increased sensitivity since the force necessary to cause such a threshold distention of the wires is made less, by the bell crank ratio, than that necessary in the form of gauge where the force is applied directly to the wires, as in the form described in the Meyer article.

It will also be noted that instead of using two wires on each face, to wit, 35a, 35b, and 36a and 36b on the opposite face, one of the wires may be omitted from each face and the wires connected to other compensating resistances external of the gauge to establish the Wheatstone bridge circuit.

It will be observed that the gauge is substantially linear, since the angular deflection of armature is at most but a fraction of a degree, the angular deflection of the rod 53 at the diaphragm 49 is negligible, and the motion of the rod 53 can be taken as a straight line within the accuracy of resistance measurements by the Wheatstone bridge as employed in strain wire gauges. This linearity is aided additionally by the fact that, since the neutral position of the wires is substantially perpendicular to the axis of the supporting pins, and since the angle traversed by the pins in the deflection is less than about a degree, the component of force parallel to the wire is directly proportional to the degree of movement of the rod 53 throughout the travel permitted by the stops 37 and 38 and within the accuracy stated above.

It will also be observed that the dimension of the gauge in the direction of the applied force is small as compared with the dimension in the direction of the wires. This permits of the construction of a flat low gauge for introduction into small flat openings or for positioning close to the bottom of a chamber as where the hydrostatic pressure over the gauge in a chamber is to be determined.

While I have described a particular embodiment of my invention for the purpose of illustration, it should be understood that various modifications and adaptations thereof may be made within the spirit of the invention as set forth in the appended claims.

I claim:

1. A dynamometer for a strain wire gauge, comprising a frame, a cantilevered armature, a hinge mounting for said armature connected to said frame and one end of said armature, the other end of said armature being free, a strain wire support mounted on said frame and spaced from said hinge, another strain wire support mounted on said armature substantially at said hinge, a strain wire mechanically connected to each of said supports and insulated from said frame and said armature, and an electrical connection at the ends of said strain wire.

2. A dynamometer for a strain wire gauge, which comprises a frame having opposed faces, a hinge mounted on said frame, an armature having opposite faces complementary to said frame faces, mounted on said hinge, pins mounted on each of said faces of said armature, pins mounted on each of the opposite faces of said frame and in line with said armature, a strain wire mechanically connected to the pins on one face of the frame and to the pins on the complementary face of the armature and extending along said armature, and a second wire connected to the pin on the opposite face of the frame and to the pin on the opposite face of the armature complementary to said last-named frame face and extending substantially parallel to said first-named strain wire, said wires being insulated from said frame and armature.

3. A dynamometer for a strain wire gauge, comprising a frame, a cantilevered armature mounted in said frame, a spring connecting one end of said armature to said frame, said cantilevered armature being hingedly mounted on said frame by said spring, the other end of said armature being free, a pin mounted on said frame opposite the free end of said cantilevered hingedly mounted armature, a pin mounted on said armature substantially at said hinge, and a strain wire mechanically connected to said pins and insulated from said frame and armature.

4. A dynamometer for a strain wire gauge, comprising a frame having opposed faces, a cantilevered armature mounted on said frame, said armature having opposed faces complementing the faces of said frame, a spring connecting one end of said armature to said frame, said cantilevered armature being hingedly mounted on said frame by said spring, the other end of said armature being free, coaxially mounted pins on each of the opposed faces of said frame adjacent the free end of said armature, coaxially mounted pins on each of the opposed faces of said armature adjacent said hinge, said pins being in line with said armature, and strain wire gauges mechanically connected and insulated from the pins on the complementary faces of said frame and said armature and extending along the length of said armature.

5. A dynamometer for a strain wire gauge, comprising a frame, a cantilevered armature, a hinge mounting for said armature connected to said frame and one end of said armature, the other end of said armature being free, a strain wire support mounted on said frame and spaced from said hinge, another strain wire support mounted on said armature substantially at said hinge, a strain wire mechanically connected to each of said supports and insulated from said frame and said armature, an electrical connection at the ends of said strain wire, and a force applying means, said means effectively applying force to said armature at a point intermediate the ends of said wires to move said armature on said hinge.

6. A dynamometer for a strain wire gauge, which comprises a frame having opposed faces, a hinge mounted on said frame, an armature having opposite faces, complementary to said frame faces, mounted on said hinge, pins mounted on each of said faces of said armature, pins mounted on each of the opposite faces of said frame and in line with said armature, a strain wire mechanically connected to the pin on one face of the frame and to the pin on the complementary face of the armature, a second wire connected to the pin on the opposite face of the frame and to the pin on the complementary opposite face of the armature and extending along said armature, said wires being insulated from said frame and armature and extending substantially parallel to said armature, and a force applying means, said means effectively applying force to said armature at a point intermediate the ends of said wires to move said armature on said hinge.

7. A dynamometer for a strain wire gauge, comprising a frame, a cantilevered armature mounted in said frame, a spring connecting one end of said armature to said frame, said cantilevered armature being hingedly mounted on said frame by said spring, the other end of said armature being free, a pin mounted on said frame opposite the free end of said cantilevered hingedly mounted armature, a pin mounted on said armature substantially at said hinge, a strain wire mechanically connected to said pins and insulated from said frame and armature, and a force applying means, said means effectively applying force to said armature at a point intermediate the ends of said wires to move said armature on said hinge.

8. A dynamometer for a strain wire gauge, comprising a frame having opposed faces, a cantilevered armature mounted on said frame, said armature having opposed faces complementing the faces of said frame, a spring connecting one end of said armature to said frame, said cantilevered armature being hingedly mounted on said frame by said spring, the other end of said armature being free, coaxially mounted pins, one on each of the opposed faces of said frame adjacent the free end of said armature, coaxially mounted pins on each of the opposed faces of said armature adjacent said hinge, strain wire gauges mechanically connected and insulated from the pins on the complementary faces of said frame and said armature, and a force applying means, said means effectively applying force to said armature at a point intermediate the ends of said wires to move said armature on said hinge.

9. A dynamometer, comprising a U-shaped frame having opposed faces, a flat armature having opposed faces, said armature fitting between the legs of the U frame, with the faces of said armature and frame coplanar, a flat spring connected to one end of said armature and to the base of the U frame and forming a hinge upon which said armature is cantilevered, the other end of said armature being free between the legs of the U frame, a pin mounted on each of the opposed faces of said frame, a pin mounted on said armature on each of the opposed faces of said armature and positioned substantially at said hinge, and strain wires mechanically connected to the pins on the coplanar frame and armature faces.

10. A dynamometer, comprising a U-shaped frame having opposed faces, a flat armature having opposed faces, said armature fitting between the legs of the U frame, with the faces of said armature and frame coplanar, a flat spring connected to one end of said armature and to the base of the U frame and forming a hinge upon which said armature is cantilevered, the other end of said armature being free between the legs of the U frame, a pair of pins mounted on each of the opposed faces of said frame, a pair of pins mounted on said armature on each of the opposed faces of said armature and positioned substantially at said hinge, and strain wires mechanically connected to the pins on the coplanar frame and armature faces.

LOUIS D. STATHAM.

REFERENCES CITED

The following references are of record in the file of this patent:

"Strain-Gage," etc., "Electronic Industries," August 1945, page 89.